(12) United States Patent
Watteyne et al.

(10) Patent No.: US 8,433,353 B2
(45) Date of Patent: Apr. 30, 2013

(54) METHOD OF COMMUNICATION, EMITTER AND RECEIVER STATIONS AND ASSOCIATED COMPUTER PROGRAMS

(75) Inventors: Thomas Watteyne, Grenoble (FR); Abdelmalik Bachir, London (GB); Michael Dohler, Barcelona (ES); Isabelle Auge-Blum, Villeurbanne (FR)

(73) Assignee: France Telecom, Paris (FR)

( * ) Notice: Subject to any disclaimer, the term of this patent is extended or adjusted under 35 U.S.C. 154(b) by 1010 days.

(21) Appl. No.: 12/305,416

(22) PCT Filed: Jun. 19, 2007

(86) PCT No.: PCT/FR2007/051474
§ 371 (c)(1),
(2), (4) Date: Apr. 24, 2009

(87) PCT Pub. No.: WO2007/148016
PCT Pub. Date: Dec. 27, 2007

(65) Prior Publication Data
US 2009/0201866 A1    Aug. 13, 2009

(30) Foreign Application Priority Data
Jun. 20, 2006    (FR) ........................ 06 05491

(51) Int. Cl.
*H04L 11/26* (2006.01)
*G06F 15/173* (2006.01)

(52) U.S. Cl.
USPC ........................... 455/510; 370/238

(58) Field of Classification Search ............... 370/254, 370/312, 410, 238, 241; 455/509, 510
See application file for complete search history.

(56) References Cited

U.S. PATENT DOCUMENTS

| | | | |
|---|---|---|---|
| 6,791,949 B1 * | 9/2004 | Ryu et al. | 370/254 |
| 7,450,582 B2 * | 11/2008 | Suh et al. | 370/392 |
| 7,764,617 B2 * | 7/2010 | Cain et al. | 370/238 |
| 8,092,906 B2 * | 1/2012 | Tachibana et al. | 428/355 EP |
| 2006/0203737 A1 * | 9/2006 | Bugenhagen | 370/252 |

FOREIGN PATENT DOCUMENTS

WO    WO 03/047175 A1    6/2003
WO    WO 2006/115577 A1    11/2006

* cited by examiner

*Primary Examiner* — Dinh T. Le
(74) *Attorney, Agent, or Firm* — Drinker Biddle & Reath LLP

(57) ABSTRACT

Method of communication, on a radio channel in a network comprising a plurality of telecommunications nodes with which are associated respective values of a metric, including emitting, from a first node, a request on the radio channel, and subsequent to the receipt of the request by at least one second node, emitting a response message with a delay determined as a function of the metric value associated with said second node.

13 Claims, 1 Drawing Sheet

METHOD OF COMMUNICATION, EMITTER AND RECEIVER STATIONS AND ASSOCIATED COMPUTER PROGRAMS

CROSS-REFERENCE TO RELATED APPLICATIONS

This application is the U.S. national phase of the International Patent Application No. PCT/FR2007/051474 filed Jun. 19, 2007, which claims the benefit of French Application No. 06 05491 filed Jun. 20, 2006, the entire content of which is incorporated herein by reference.

FIELD OF THE INVENTION

The present invention relates to communication techniques used in telecommunications networks. It applies particularly, but not exclusively, in ad hoc networks.

BACKGROUND OF THE INVENTION

Ad hoc networks are communication networks devoid of fixed infrastructure. A certain number of wireless stations are equipped with radio emission and/or reception means and with appropriate protocols to form the nodes of the ad hoc network.

These stations making up the ad hoc network can be in the form of fixed or portable computers, pocket computers, mobile telephones, vehicles, electrodomestic appliances, etc. The emission-reception means can also be associated with simple objects such as sensors or actuators. An ad hoc network of sensors thus makes it possible to perform information collection for example with a view to monitoring or controlling installations.

The success of ad hoc networks depends a great deal on the lifetime of the stations constituting the nodes of the network. Energy saving is a crucial factor for designing long-lifetime sensor networks, in particular because on the one hand the nodes are generally powered by cells which are generally expensive and difficult, or even impossible, to replace or recharge and because on the other hand, energy sources such as cells or batteries are sources of pollution.

Ad hoc networks have severe operating constraints. First of all, there is no fixed infrastructure. The nodes have to cooperate to allow exchanges. Additionally, the structure of the network varies: new nodes can integrate the network, while nodes disappear, in particular when they no longer have any energy reserve. When data has to be dispatched from one node to a final recipient node, the data are transferred via several successive hops between intermediate nodes, each intermediate node being within radio range of the previous node and of the following node.

To allow in particular each node, liable to emit data, to address these data to a node which on the one hand lies within radio range of the emitter node and on the other hand is the most appropriate to be the next intermediate node to receive and emit the data, each node has information on any node situated within radio range. The nodes situated within radio range of a given node constitute the 1-hop neighbourhood of the given node, which varies as a function of several factors such as the introduction or the disappearance of nodes, the distance between the given node and the neighbouring nodes, the transmission powers of the nodes, the gains and radiation patterns of the antennas respectively associated with the nodes, the interference etc.

This information available to each node X, relating to the nodes of its 1-hop neighbourhood, is in particular utilized to define, within the framework of routing decisions, the node Y, from among those constituting the 1-hop neighbourhood of node X, to which X has to address a message to be forwarded ultimately to a target node D.

This information defining the 1-hop neighbourhood is obtained in the prior art with the aid of periodic exchanges of information. Each node periodically dispatches a data packet dubbed "HELLO" containing its identifier and a value associated with this node, dubbed the metric. By listening to the HELLO packets thus emitted, each node X constructs and maintains a data table comprising the identifiers of the nodes from which node X has recently received a HELLO packet and their respective metric value. This table defines the nodes making up the 1-hop neighbourhood of node X. When a node X has to select a node from among the nodes of its 1-hop neighbourhood, to which to transmit data, it makes this selection as a function of the data table available to it.

This technique nevertheless presents drawbacks. First of all, the dispatching of the HELLO packets allowing the updating of a node's information table takes place only at given periods. The information contained in the table is therefore rapidly obsolete and the decisions taken pursuant to the utilization of this information are therefore not always apt.

Additionally, the implementation of these systematic exchanges consumes a not-inconsiderable quantity of energy, independently of whether or not a node uses the information contained in a new HELLO packet received.

Additionally, this mechanism for exchanging information and for utilizing the table can be viewed as belonging to the routing layer and does not take into account the current constraints at the level of the MAC layer, which leads to energy losses.

There is therefore a need to gather, at the level of a node, non-obsolete information characterizing the nodes of its 1-hop neighbourhood, and to limit the energy expenditure of the nodes.

SUMMARY OF THE INVENTION

According to a first aspect, the invention proposes a method of communication, on a radio channel in a network comprising a plurality of telecommunications nodes, with which are associated respective values of a metric, comprising the following steps:

/a/ emitting, from a first node, a request on the radio channel;

/b/ subsequent to the receipt of the request by at least one second node, emitting a response message with a delay determined as a function of the metric value associated with said second node.

A method according to the invention thus allows the first node to ascertain the metric of a node or of several nodes lying in its 1-hop neighbourhood. This information on the 1-hop neighbourhood is provided only on request, when the first node needs this information, thereby making it possible on the one hand to limit its obsolescence and making it possible on the other hand to save energy.

In an embodiment, the delay is an increasing function or a decreasing function of the metric. This arrangement enables the first node to firstly receive the response of the node, from among the nodes of its one-hop neighbourhood, which will be particularly relevant to it, for example because it is the closest to the target node, or that which has the most residual energy etc.

In an embodiment, the first node selects the second node that was the first to emit a message in response to the request.

In an embodiment, the nodes are adapted for listening to the radio channel intermittently and in a first mode, the first node switches to inactive mode of listening to the radio channel at the end of the receipt of the response message emitted first on the radio channel, and until the end of a fixed period counting from the emission of the request, said period being fixed as a function of minimum and maximum values of the metric. This arrangement makes it possible to transmit the data to the point of the one-hop neighbourhood that is most suitable while allowing the network to save the overall electrical energy of the nodes.

In an embodiment, the second node is adapted for switching to active listening mode at the end of said fixed period. This arrangement allows the set of second nodes of the one-hop neighbourhood of the first node that responded to the request, to all listen for a short message emitted, in the first mode, at this moment by the first node and indicating the second node selected. The unselected second nodes can thereafter return to inactive mode of reception.

In an embodiment, the method comprises in a second mode, the following steps right from the end of the emission of the request message:

emission of a selection message by the first node, indicating a selected node, followed by the emission of a data message and of a jamming message with a view to occupying the radio channel until the end of a fixed period counting from the emission of the request, this period being fixed as a function of minimum and maximum values of the metric.

This arrangement makes it possible to transmit the data to the point of the one-hop neighbourhood that is most suitable while allowing the network to save the overall electrical energy of the nodes.

In an embodiment, the first node selects a mode from among the first mode and the second mode as a function of a comparison that it carries out, between a fixed threshold value and the value of the metric indicated by the delay in emitting the response message of the second node.

This arrangement makes it possible to adapt the mode of exchange as a function of the time span before the emission of the first response to the request of the first node, the effect of which is to make it possible to save energy.

In an embodiment, the second node switches to active mode of reception subsequent to the emission of its response message. This arrangement allows it to adapt to receive data dispatched according to the second mode.

In an embodiment, the determined delay before the emission of the response message by the second node is counted from the end of the emission of the request, both by the first node and by the second node.

According to a second aspect, the invention proposes an emitter/receiver station for forming a node of a telecommunications network comprising a plurality of nodes adapted for communicating on a radio channel and with which are associated respective values of a metric. The station comprises:

means for emitting a request on the radio channel;
means for receiving from at least one node a message in response to the request;
means of temporal measurement for measuring a delay, relating to the emission of said message in response to the request and dependent on the value of the metric associated with said node;
means for selecting a node as a function of said measured delay.

According to a third aspect, the invention proposes an emitter/receiver station for forming a node of a telecommunications network comprising a plurality of nodes adapted for communicating on a radio channel and with which are associated respective values of a metric. The station comprises:

means for receiving a request from a node;
means of temporal measurement for measuring a duration;
means for emitting a message in response to said request with a delay determined as a function of the metric value associated with the node having received the request and established with the aid of the means of temporal measurement.

According to a fourth aspect, the invention proposes a telecommunications network comprising a plurality of nodes adapted for communicating on a radio channel and with which are associated respective values of a metric. The nodes comprise an emitter/receiver station in accordance with the second and third aspects of the invention.

According to a fifth aspect, the invention proposes a computer program to be installed in an emitter/receiver station for forming a node of a telecommunications network comprising a plurality of nodes adapted for communicating on a radio channel and with which are associated respective values of a metric. This program comprises instructions for implementing the following steps during an execution of the program by processing means of the station:

emitting a request on the radio channel;
receiving from at least one node a message in response to the request;
measuring a delay, relating to the emission of said message in response to the request and dependent on the value of the metric associated with said node;
selecting a node as a function of said measured delay.

According to a sixth aspect, the invention proposes a computer program to be installed in an emitter/receiver station for forming a node of a telecommunications network comprising a plurality of nodes adapted for communicating on a radio channel and with which are associated respective values of a metric. This program comprises instructions for implementing the following steps during an execution of the program by processing means of said station:

receiving a request from a node;
measuring a duration determined as a function of the metric value associated with the node that received the request;
emitting a message in response to said request with a delay established with the aid of the measured duration.

Thus the information on the 1-hop neighbourhood is requested according to the invention on demand, when a node needs this information, and not in a systematic manner. A method according to the invention makes it possible in particular to save energy, and to no longer handle obsolete information.

BRIEF DESCRIPTION OF THE DRAWINGS

Other characteristics and advantages of the invention will be further apparent on reading the description which follows. The latter is purely illustrative and should be read in conjunction with the appended drawings in which.

DETAILED DESCRIPTION OF THE INVENTION

Figure 1:
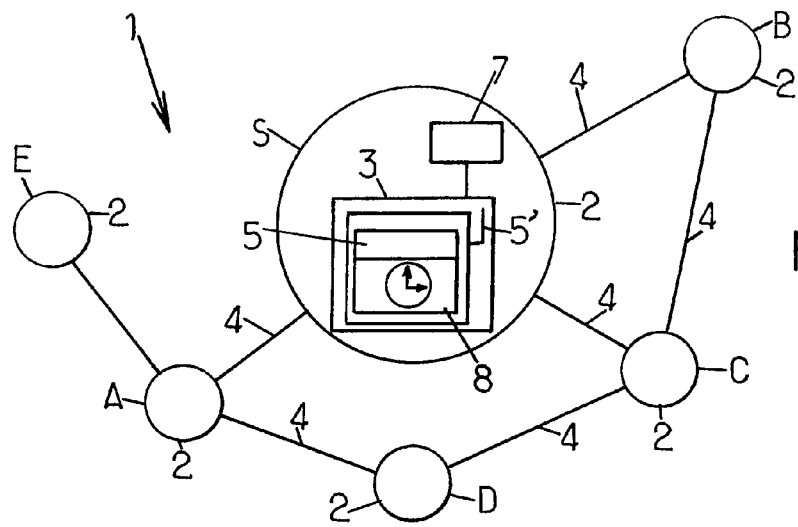
FIG. 1 is a diagram of an ad hoc wireless network in a mode of implementation of the invention.

In FIG. 1 is represented a part of a telecommunications network 1, in the case considered, an ad hoc network, comprising a plurality of emitter-receiver stations 2 each intended to constitute a node of the ad hoc network 1.

A node 2 comprises, with a view to exchanging signals with a neighbouring node by way of a shared radio channel 4, emission/reception means 3 comprising a processing module 5, linked to an antenna 5', which ensures the processing operations of the physical layer (layer 1 of the OSI model) and link layer (layer 2 of the OSI model).

The emission/reception means 3 furthermore comprise a counter 8.

The emission/reception means 3 are turned on/off by control means 7.

These modules have been represented in FIG. 1 for the node S. Nodes A, B, C, D of the network 1 also comprise similar modules.

The various circuits of a node 2 are supplied with electrical energy from a source (not represented) associated with the node 2, such as a cell.

In most cases, the digital processing operations carried out by the module 5 are executed by a central processor of the node 2, under the control of appropriate programs. One of these programs, in accordance with the invention, intervenes in the module 5.

The nodes making up the 1-hop neighbourhood of a given node are the nodes lying within radio range of the given node, that is to say the nodes that are able to exchange a message with the given node directly on the radio channel 4, without needing to pass via an intermediate node relaying the message.

With reference to FIG. 1, the nodes of the 1-hop neighbourhood of node S are nodes A, B and C, linked directly to node S by the radio channel 4.

A message emitted on the channel 4 incorporates an address of the node which emitted it and an address of the node or nodes for which it is intended.

Each node is associated with a value taken by a metric. Nodes A, B, C are in particular associated respectively with the metric values $f_A$, $f_B$, $f_C$.

In the particular case considered with reference to the drawings, the metric is a function which represents for example the distance between the node with which the metric is associated, and a target node $N_{target}$ and $f_A=1$, $f_B=3$, $f_C=2$. The metric of any node of the network 1 lies in a fixed interval $[f_{min}, f_{max}]$.

Node S has to send a data message DATA to the target node $N_{target}$. In order to determine to which node of its 1-hop neighbourhood the message DATA should be dispatched, it is necessary for node S to have access to information relating to its 1-hop neighbourhood, in particular to the definition of the nodes of which it is composed and to the associated metric information. In the example considered, node S is adapted for selecting the node from among those of its 1-hop neighbourhood, which exhibits the smallest metric.

The processing module 5 of node S then formulates a message, REQ, and transmits it on the radio channel 4, via the antenna 5' of node S. The message REQ requests the provision of information characterizing the 1-hop neighbourhood of node S. It indicates the identifier of node S.

The message REQ thus formulated by node S comprises a sequence of m*k micro-frames (m an integer strictly greater than 0), $T_{M1}$, $T_{M2}$ ... $T_{Mm*k}$. Each micro-frame $T_{Mj, j=1 \text{ to } m*k}$ of the sequence comprises an indication of the number of micro-frames of the sequence remaining to be transmitted after the current micro-frame $T_{Mi}$.

In the embodiment considered, each micro-frame $T_{Mj, j=1 \text{ to } m*k}$ comprises for example a field indicating that the message is a request for information on a 1-hop neighbourhood, a field indicating the identifier of node S, and a field indicating the number of micro-frames (m*k−j) remaining to be transmitted.

Additionally, each node 2 of the network 1 is adapted to be in active radio listening mode (emission/reception means turned on) at wakeup moments (a node is then said to be awake) and to be in inactive radio listening mode (emission/reception means turned off) between these wakeup moments (a node is then said to be asleep), the moments of active and inactive radio listening mode of various nodes not necessarily being concomitant. The control means 7 are adapted for sending the nodes to sleep and waking them up, by ordering the emission/reception means to turn off and to turn on.

This intermittent radio channel listening makes it possible to reduce the cost overhead of passive listening and to limit the energy consumption of a node.

Figure 2:
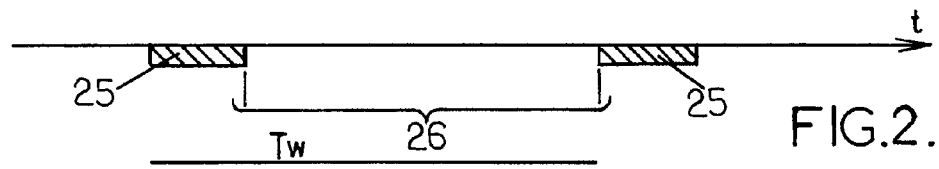
FIG. 2 illustrates intermittent channel listening by a node.

With reference to FIG. 2, a node 2 is thus in active radio listening mode (radio turned on) during brief and periodic waking moments, of determined duration d, represented by the rectangles 25 along the time axis t. Two consecutive waking moments are spaced out by long inter-waking periods 26, during which the receiver node 2 is in inactive radio listening mode. The time separating the start of two consecutive wakeup moments 25 is equal to Tw.

During the wakeup moments 25, the node switches to active radio listening mode to listen to the radio channel 4 and determine whether there is a message transmitted on the channel. If the node determines that the channel is free, it returns to an inactive radio listening state (radio turned off) at the conclusion of the moment 25. On the other hand, if it detects, during the listening moment 25, the presence of a signal, it remains in active radio listening mode to receive and decode a micro-frame.

A node having to emit a message will emit this message only when the radio channel 4 has been freed.

The message REQ such as formulated by node S is of a duration greater than or equal to the duration Tw separating the start of two consecutive periodic waking moments of the nodes 2 of the network 1. This makes it possible to guarantee that the message REQ will be broadcast during a wakeup moment, of duration d, of each node listening on the radio channel 4.

Right from the end of transmission of the message REQ (instant T1), node S trips its counter 8 and switches to the mode of active radio listening to the radio channel 4 with a view to detecting at least one first acknowledgement message for a node, in the one-hop neighbourhood of node S, that has received the message REQ.

Figure 3A:
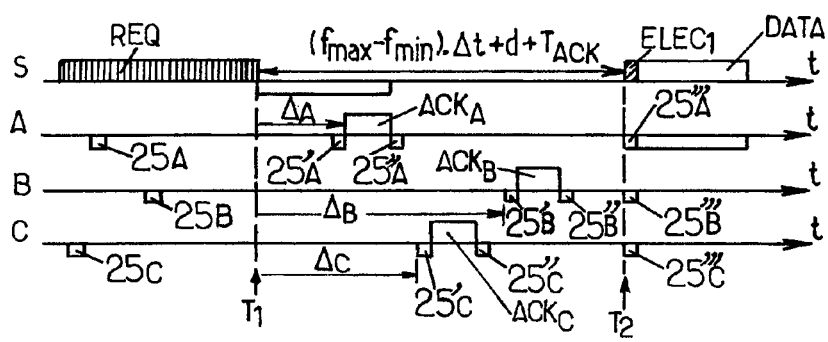
FIG. 3a represents the operations of emission and reception, in relation to the time axis t, of nodes S, A, B, and C in a first mode.
Figure 3B:
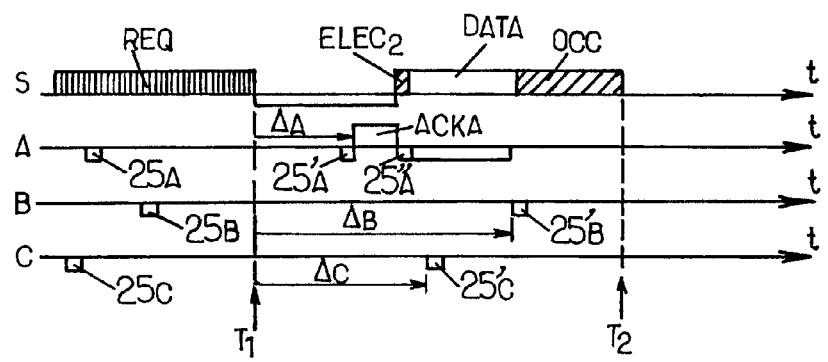
FIG. 3b represents the operations of emission and reception, in relation to the time axis t, of nodes S, A, B, and C in a second mode.

In FIGS. 3a and 3b are represented as a function of time the various steps during emission (hatched zones above the time axis) and during listening (hatched zones below the time axis) of nodes S, A, B, C in a first (FIG. 3a) and a second (FIG. 3b) mode of exchanges between node S and the nodes of its 1-hop neighbourhood.

Following the emission of the request REQ, with reference to FIGS. 3a and 3b, on the occasion of a wakeup moment, each node within radio range of node S, that is to say each node A, B, C of the 1-hop neighbourhood of node S, detects the emission of a signal on the radio channel 4, and thus receives a micro-frame of the message REQ.

Thus the node A, with the aid of its processing module 5, receives a micro-frame of the message REQ during a periodic wakeup moment $25_A$. It extracts from the micro-frame of the message REQ received, the indication of the number of micro-frames of the message REQ remaining to be transmitted and deduces, as a function of this indication and of the duration of a micro-frame, the instant T1 of the end of transmission of the message REQ by node S. It also calculates a value $\Delta_A = (f_A - f_{min}) \cdot \Delta t$, where $f_A$ is the value of the metric associated with node A and $\Delta t$ a determined constant.

Once the micro-frame has been received by node A, the control means 7 of node A order node A to go to sleep. At the instant T1, node A triggers its counter 8. The control means 7 of node A order the emission/reception means 3 of node A to wake up once the counter 8 has counted a time span equal to the value $\Delta_A$, so as to poll the radio channel 4 during a wakeup period $25_A'$ of duration d. If the radio channel 4 is free, node A, with the aid of its processing module 5, emits an acknowledgement message $ACK_A$ indicating that node A has indeed received the message REQ. This acknowledgement message $ACK_A$ comprises the identifier of node S and the identifier of node A.

Once the acknowledgement message $ACK_A$ has been emitted, the control means 7 of node A order an active listening period $25_A''$ of duration d, so as to poll the radio channel 4 and detect whether there is transmission on the channel 4 of a message for its attention. In the converse case, the respective control means 7 of the node A order node A to go to sleep until the instant T2, with $T2 = T1 + (f_{max} - f_{min}) \cdot \Delta t + d + T_{ACK}$, where $T_{ACK}$ is the duration of emission of an acknowledgement frame. The control means 7 order the emission/reception means 3 of node A to wake up at this instant T2, for a listening period $25_A'''$ of duration d.

Similarly, nodes B and C, with the aid of their respective processing module 5, receive a micro-frame of the signal REQ during a periodic wakeup moment, respectively $25_B$ and $25_C$. They extract from the micro-frame respectively received, the indication of the respective number of micro-frames remaining to be transmitted and deduce therefrom the instant T1 of the end of transmission of the message REQ by node S. They also each calculate a value, respectively $\Delta_B = (f_B - f_{min}) \cdot \Delta t$ and $\Delta_C = (f_C - f_{min}) \cdot \Delta t$, where $f_B$ and $f_C$ are the metrics associated with nodes B and C.

Once the micro-frame of the signal REQ has been received, the respective control means 7 of nodes B and C order nodes B and C to go to sleep. At the instant T1, nodes B and C trigger their respective counter 8. Their respective control means 7 order the emission/reception means of nodes B and C to wake up once the counter has counted a time span equal to the value $\Delta_B$, for node B, respectively once the counter has counted a time span equal to the value $\Delta_C$, for node C, so as to poll the radio channel 4, during a wakeup period $25_B'$ of duration d for node B and during a wakeup period $25_C'$ of duration d for node C. If the radio channel 4 is free during listening $25_B'$ node B emits an acknowledgement message $ACK_B$ indicating that node B has indeed received the message REQ. This acknowledgement message $ACK_B$ comprises the identifier of node S and the identifier of node B. And if the radio channel 4 is free during listening $25_C'$, node C emits an acknowledgement message $ACK_C$ comprising the identifier of node S and the identifier of node C and indicating that node C has indeed received the message REQ.

Once the acknowledgement signals $ACK_B$ and $ACK_C$ have been emitted, the respective control means 7 of nodes B and C order an active listening period $25_B''$, respectively $25_C''$ of duration d, so as to poll the radio channel 4 and detect whether there is transmission on the channel 4 of a message for their attention. In the converse case, the respective control means 7 of nodes B and C order nodes B and C to go to sleep until the instant T2. Their respective control means 7 order the emission/reception means of nodes B and C to wake up at this instant T2, for a listening period $25_B'''$, respectively $25_C'''$, of duration d.

Nodes A, B, C and S are therefore synchronized at the instants T1 and T2.

The nodes are additionally adapted so as to no longer seek to emit an acknowledgement message, following the receipt of the message REQ, after the instant T2 (for example because the channel 4 is occupied between the moment when they began to seek to emit it and the instant T2) determined as a function of the message REQ as described above.

Then node S, which has been listening to the radio channel 4 since the emission of the message REQ, receives the first acknowledgement message emitted by a node, here the acknowledgement message $ACK_A$ of node A (the metric $f_A$, associated with node A being, in the embodiment considered, the smallest metric from among those associated with the nodes of the 1-hop neighbourhood of node S). The information then given by the counter 8 of node S is $d + \Delta_A = d + f_A \cdot \Delta t$. Knowing $\Delta t$ and d, node S deduces therefrom the value $f_A$ of the metric associated with node A, tagged by the identifier indicated in the acknowledgement message $ACK_A$.

Node S thus accesses the information that node A is a node of its 1-hop neighbourhood and that furthermore, node A is the node of its 1-hop neighbourhood exhibiting the smallest metric value.

Then node S compares the information $(d + \Delta_A)$ with a determined threshold value $\Delta_{thresh} = f_{thresh} \cdot \Delta t$.

Advantageously, $$f_{thresh} = (f_{max} \cdot \Delta t + (2 - N)T_{ACK} + 2d)\frac{1}{\Delta t},$$

where N is the mean number in a 1-hop neighbourhood of a node, said node inclusive.

If $d + \Delta_A \leq \Delta thresh$, the control means 7 of node S order node S to go to sleep until the instant T2, as represented in FIG. 3a.

When nodes B and C emit their respective acknowledgement message $ACK_B$ and $ACK_C$, at the instants $T1 + d + \Delta_B$ and $T1 + d + \Delta_C$, node S therefore does not receive them.

At the instant T2, the control means 7 of node S order node S to wake up. Node S then emits a message ELEC1 advising that node A, tagged by its identifier, has been chosen by node S, followed by the data message DATA.

The message ELEC1 is received by nodes A, B and C of the 1-hop neighbourhood of node S, since they are then in an active listening period $25_A'''$, $25_B'''$, $25_C'''$. This message indicating that the elected node is node A, the control means 7 of nodes B and C order them to go to sleep at the conclusion of the active listening period $25_B'''$, $25_C'''$ of duration d, while node A remains in active listening mode beyond the period $25_A'''$, so as to receive the data message DATA.

The sum of the energy consumed in order to emit the acknowledgement messages $ACK_B$ and $ACK_C$ is less than the energy that node S would have consumed if it had continued to listen to the radio channel 4 after having received the acknowledgement message $ACK_A$ emitted by node A.

If during the comparison step performed by the node, it is determined that $d + \Delta_A > \Delta thresh$, node S then emits, with reference to FIG. 3b, a message ELEC2 advising that node A, tagged by its identifier, has been chosen, followed by the data message DATA, then by a jamming signal OCC, intended to occupy the radio channel 4 until the instant T2.

The message ELEC2 is received by node A, since it is then in an active listening period $25_A'''$. This message indicating that the elected node is node A, node A remains in active listening mode beyond the period $25_A'''$, so as to receive the data message DATA.

When nodes B and C, respectively at the instants $T1+d+\Delta_B$ and $T1+d+\Delta_C$, will seek to emit their respective acknowledgement message $ACK_B$ and $ACK_C$, they will poll the radio channel 4 during the wakeup periods $25_B'$ and $25_C'$ of duration d, and find that the radio channel is occupied. When the radio channel is subsequently freed, they will no longer seek to emit their acknowledgement message since the instant T2 will have passed.

The energy that S consumes in order to emit the jamming signal OCC is less than the energy that nodes B and C would have consumed by emitting the acknowledgement signals $ACK_B$ and $ACK_C$.

By thus adapting the behaviour of node S as a function of the time corresponding to the time span for receiving the first acknowledgement message, it is possible to make additional energy savings.

The metric described above represents the distance to a target node. The invention can be implemented in relation to other metrics, for example representing the residual energy of the node, the measured temperature, the number of hops up to a given node, geographical coordinates (X, Y, Z) etc.

The delay calculated by a node of the 1-hop neighbourhood of node S described above is equal to a constant multiplied by the difference between the value of the metric associated with the node of the neighbourhood and the minimum value of the metric. In another embodiment, this delay can be an arbitrary function of the metric, agreed between the nodes, allowing node S to receive firstly the metric of relevance.

The selection criterion applied by node S can be varied: smallest distance to the target node as described above, largest distance to the target node, smallest or largest energy, smallest or largest temperature measured etc. Thus advantageously, according to the case, the delay with which the acknowledgement message is emitted is an increasing or decreasing function of the metric.

In the case described with reference to the drawings, node S uses the metric information received to select the node of its 1-hop neighbourhood to which it will address data, so that the number of hops necessary to convey the data to the target recipient is the minimum possible. In another embodiment, the metric information received will be utilized to select a node of the neighbourhood exhibiting the highest residual energy, and thus save the energy of nodes of the neighbourhood exhibiting lower residual energies.

In another embodiment of the invention, the metric information obtained is utilized to construct groups of nodes dubbed clusters, so as to render the routing more effective in an ad hoc network comprising a large number of nodes.

In the embodiment described, node S does not receive any information about the whole of its 1-hop neighbourhood, but receives only the information about the most relevant node. In another embodiment, node S receives all the acknowledgement signals for the nodes of its 1-hop neighbourhood, and utilizes the various metric values thus received.

An additional advantage offered by the invention is that the operations indicated above are managed by the MAC layer, whereas in the prior art, the management of the HELLO packets necessary for the knowledge of its 1-hop neighbourhood was carried out at the level of the routing layer (layer 3). There is therefore less energy loss due to the fact that the two layers have been designed jointly, there is therefore no energy loss due to poor interaction between the layers.

The invention claimed is:

1. A method of communication, on a radio channel in a network comprising a plurality of telecommunications nodes, with which are associated respective values of a metric, the telecommunications nodes being adapted to be in an active mode of listening to the radio channel at waking moments and in an inactive mode of listening to the radio channel between these waking moments, said method comprising the following steps:
    a) transmitting, from a first node, a request on the radio channel;
    b) responsive to receipt of the request by at least one second node, transmitting a response message after a delay $d+\Delta_A$, wherein $\Delta_A$ is a period of time determined as a function of the metric value associated with said second node, and d is a determined duration of periodic waking moments of said second node.

2. The method according to claim 1, wherein the function of the metric is at least one of a first function that increases as the metric increases, or a second function that decreases as the metric decreases.

3. The method according to claim 1, further comprising selection, by the first node, of a third node that was first to transmit a message in response to the request.

4. The method according to claim 1, the telecommunications nodes being adapted to change between the active mode of listening to the radio channel and the inactive mode of listening to the radio channel, wherein in a first mode, the first node changes to the inactive mode of listening to the radio channel at the end of the receipt of the response message transmitted on the radio channel, and until the end of a fixed period starting from the transmission of the request, said fixed period being determined based on minimum and maximum values of the metric.

5. The method according to claim 4, wherein the second node is adapted to change to the active listening mode at the end of said fixed period.

6. The method according to claim 5, comprising the following steps after an end of said fixed period:
    transmitting a selection message, by the first node, indicating a selected node, then transmitting a data message;
    reception of said selection message by the second node; then if a node indicated in said message is not the second node, changing the second node to the inactive radio listening mode, otherwise maintaining the second node in the active radio listening mode to receive the data message.

7. The method according to claim 1, comprising, in a second mode, the following steps after an end of the transmission of the request message:
    transmitting a selection message by the first node, indicating a selected node, followed by the transmitting a data message and a jamming message occupy the radio channel until an end of a fixed period starting with the transmission of the request, said fixed period being determined based on minimum and maximum values of the metric.

8. The method according to claim 7, wherein the first node selects a mode from among the active mode of listening and the inactive mode of listening based on a comparison between a fixed threshold value and the delay in transmitting the response message of the second node.

9. The method according to claim 1, wherein the second node changes to the active mode of listening after transmitting its response message.

10. The method according to claim 1, wherein the determined delay before the transmission of the response message by the second node is measured from the end of the transmission of the request.

11. The method according to claim 1, further comprising:
receiving by the first node said response message from said second node;
determining at the first node from the delay $d+\Delta_A$ relating to the emission of said response message the metric value of said second node; and
selecting a third node that exhibits the smallest metric value.

12. A non-transitory computer-readable medium storing a computer program to be installed in an emitter/receiver station for forming a node of a telecommunications network comprising a plurality of nodes adapted for communicating on a radio channel and with which are associated respective values of a metric, the nodes being adapted to be in an active mode of listening to the radio channel at waking moments and in an inactive mode of listening to the radio channel between these waking moments, said program comprising instructions for implementing the following steps during an execution of the program by processing means of said station:
transmitting a request on the radio channel;
receiving from at least one node of the plurality of nodes a message in response to the request;
measuring a delay $d+\Delta_A$, wherein $\Delta_A$ is a period of time relating to the emission of said message in response to the request and dependent on the value of the metric associated with said node of the plurality of nodes, and d is a determined duration of periodic waking moments of said plurality of nodes;
selecting a second node of the plurality of nodes based on said measured delay.

13. A non-transitory computer-readable medium storing a computer program to be installed in an emitter/receiver station for forming a node of a telecommunications network comprising a plurality of nodes adapted for communicating on a radio channel and with which are associated respective values of a metric, the nodes being adapted to be in an active mode of listening to the radio channel at waking moments and in an inactive mode of listening to the radio channel between these waking moments, said program comprising instructions for implementing the following steps during an execution of the program by processing means of said station:
receiving a request from a node of the plurality of nodes;
transmitting a response message to said request with a delay established with the aid of a determined duration as a function of the metric value associated with the node having received the request.

* * * * *